May 2, 1939.  A. L. STOWELL ET AL  2,156,905
COILABLE MEASURING RULE
Filed Feb. 13, 1937   2 Sheets-Sheet 1

Inventor
Austin L. Stowell
Frederick A. Volz

By W. Clay Lindsey.
Attorney

May 2, 1939.   A. L. STOWELL ET AL   2,156,905
COILABLE MEASURING RULE
Filed Feb. 13, 1937   2 Sheets—Sheet 2
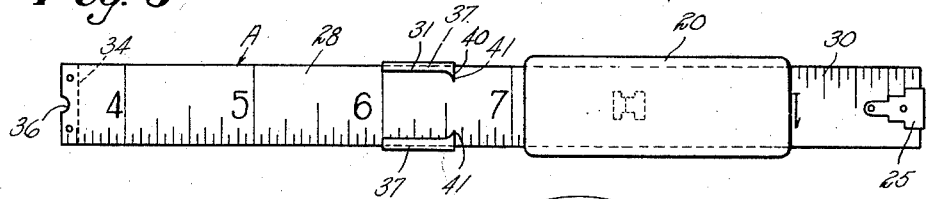
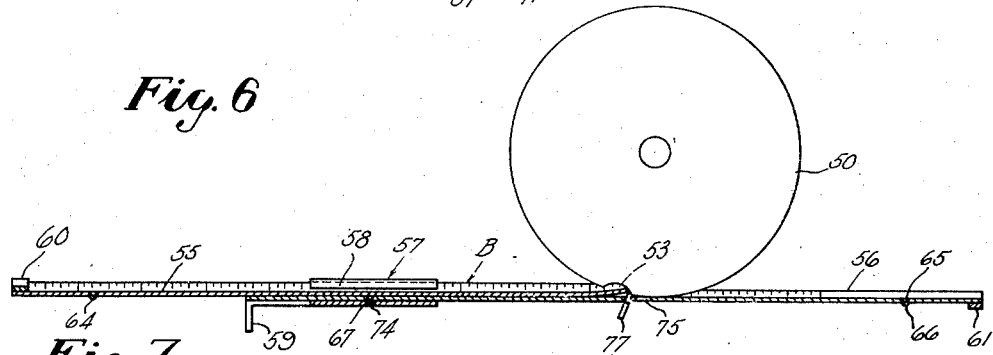
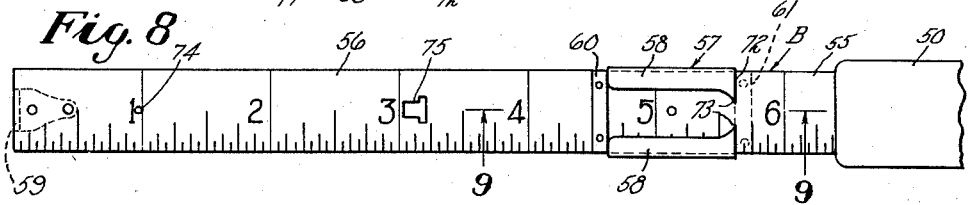
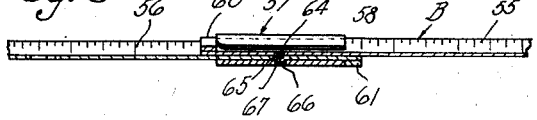
Inventor
Austin L. Stowell
Frederick A. Volz
By *T. Roy Lindsey*
Attorney Patented May 2, 1939

2,156,905

UNITED STATES PATENT OFFICE 2,156,905

COILABLE MEASURING RULE

Austin L. Stowell and Frederick A. Volz, New Britain, Conn., assignors to The Stanley Works, New Britain, Conn., a corporation of Connecticut Application February 13, 1937, Serial No. 125,531

7 Claims. (Cl. 33—138)

This invention relates to coilable rules of the type having a casing and a measuring tape adapted to be wound therein into an externally wound coil, the tape being in the form of a thin resilient metal strip having a bent transverse form, (for example, a concavo-convex cross section) so that it will resist bending and will, when extended, automatically assume a rectilinear state or rod-like form.

Heretofore, in flexible measuring tapes of this general type, various separate attachments have been provided and detachably secured to the tape to aid in employing it for making inside measurements. However, these various attachments have been such as to necessitate reading the inside measurement upon a different scale from that employed when the tape is used for making outside measurements, thereby leading to frequent inaccuracies of measurement due to the fact that the operator often tends to employ the wrong scale in determining measurements.

It is, therefore, the primary object of this invention to provide an improved, simple measuring device of the class described whereby inside measurements as well as outside measurements may be conveniently indicated on the same scale.

A further object of our invention is the provision of an improved arrangement whereby an end portion of the tape may be cooperatively and selectively employed to aid in the use of said tape for either inside or outside measurements, as may be desired.

It is a further object of our invention to provide a tape capable of being used for both inside and outside measurements which is simple in construction, easy to use, and incapable of causing inaccuracies, and which utilizes the same scale for indicating either outside or inside measurements, as may be required.

Other objects will be apparent from the ensuing description of our invention.

This invention accordingly consists in the features of construction, combination of elements, and arrangement of parts which will be exemplified in the construction hereinafter disclosed and the scope of the application of which will be indicated in the appended claims.

In the accompanying drawings wherein we have shown, for illustrative purposes, two embodiments of our invention, and wherein like numerals indicate like parts:

Fig. 5 is a plan view of our rule with the parts in the same positions as shown in Fig. 2;

Fig. 6 is a side elevation of another embodiment of our invention showing the parts of the tape locked in position to take inside measurements;

Fig. 7 is a plan view of the parts in the positions shown in Fig. 6;

Fig. 8 is a plan view of the type of rule shown in Fig. 6 with the tape locked in position to take outside measurements; and Fig. 9 is a fragmentary sectional view taken substantially along the line 9—9 of Fig. 8 and showing the locking means employed to hold the tape parts in operative position for taking outside measurements.

Figure 1:
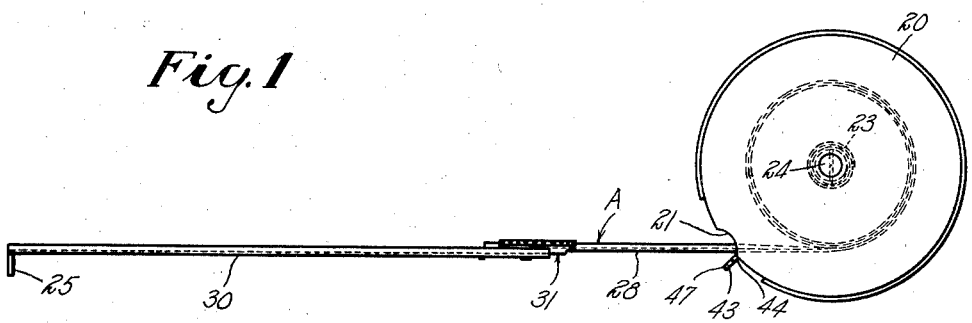
Figure 1 is a side elevation of one embodiment of our improved type of rule having the measuring tape partially extended as in normal use for taking outside measurements.

Referring to the drawings in detail with reference to one embodiment of our invention as illustrated in Figs. 1 to 5, inclusive, we have provided a casing or holder 20 which may be of any suitable size or shape and which, for illustrative purposes, is herein shown as being generally circular and having an entrance slot 21 provided within its peripheral wall. The measuring tape, designated generally by the letter A, is preferably of the type disclosed in the patents to Farrand, Nos. 1,402,589 and 1,730,199, respectively issued on January 3, 1922, and October 1, 1929. In the present invention, this tape is in the form of a two-part flexible metallic ribbon. Each of these parts has a similar concavo-convex cross section, and they are arranged to be slidably secured together in longitudinal alignment and locked in cooperative and consecutive measuring relation in such a manner that the assembled ribbon has sufficient flexibility to be easily rolled or coiled within the casing and yet has sufficient stiffness and resiliency, due principally to its curved transverse form, to normally cause it to assume a rectilinear state when withdrawn from the casing.

We preferably incorporate the improvements of the present invention with a rule of the pull-push type having the above described transverse curvature, and, for illustrative purposes, we have herein shown a resiliently coiled winding strip 23 within the casing 20 secured at its inner end to a stud 24 in the casing and fastened at its outer end to the inner end of the measuring tape A. The winding strip 23 is preferably coiled under such tension as to counterbalance the resistance of friction of the parts and the tendency of the measuring tape to resist bending as it is fed into and out of the casing. The outer end of the tape is provided with a laterally projecting hook 25 whereby it may be conveniently engaged against the edge of a member to aid in positioning the outer end of the tape during a measuring operation. This hook further serves as a handle to withdraw the coiled tape from the casing and also prevents the tape from being completely entered into the casing to an inaccessible position.

Figure 2:
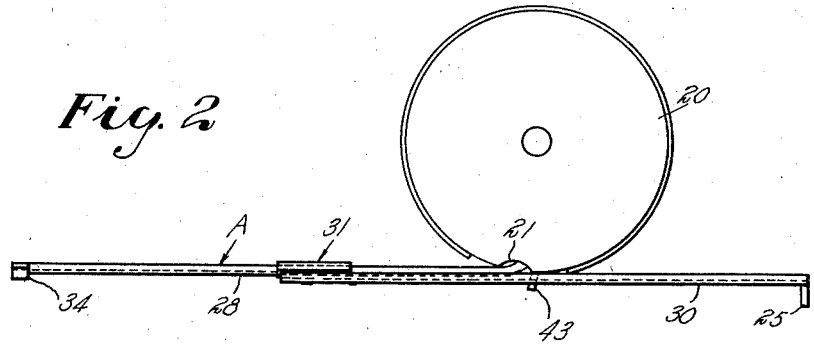
Fig. 2 is a view of the same parts shown in Fig. 1 but illustrating the rule in position to be employed for taking inside measurements.
Figure 3:
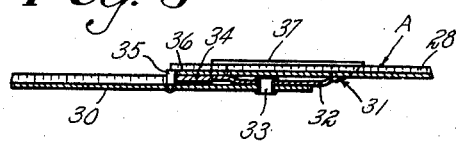
Fig. 3 is an enlarged fragmentary longitudinal section of the rule illustrated in Fig. 1 and showing the parts locked in position to be utilized for taking outside measurements.
Figure 4:
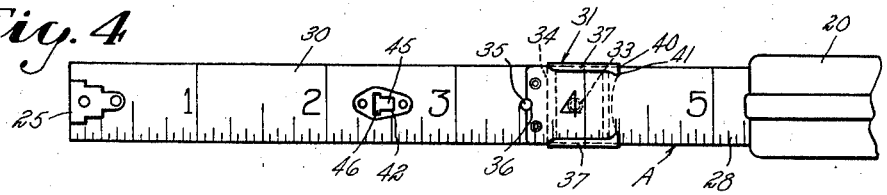
Fig. 4 is a plan view of the rule showing the parts in the position indicated in Fig. 1.

As illustrated in Figs. 1 to 5, the tape is provided with a main body portion 28 and a relatively short extension or cooperable end length 30 which is slidably secured thereto by means of a slide member 31 embracing the body portion of the tape in such manner as to be slidably and frictionally positioned thereon. As shown in Figs. 4 and 5, the concaved or upper faces of the extension and the body portions of the tape are each provided with a single graduated measuring scale, and these tape portions are adapted to be so positioned relative to each other that the scales may be cooperatively used in consecutive registering relation. In the present showing, it will be noted that the zero end of the tape lies at the hook end of the extension, and the scale on the body portion of the tape is so located that it may lie in continuing relation with the extension.

The slide 31 is provided with a depressed portion 32 extending rearwardly from the body portion of the rule and arranged to receive the head of a rivet 33 which secures the end of the extension thereto for pivotal movement about an axis perpendicular to the plane of the extended portion of the tape, as shown in Fig. 3. A transverse stop 34 secured to the outer or free end of the body portion 28 in any suitable manner, as by rivets, serves as an abutment which prevents the extension 30 from being completely withdrawn from the body portion and also serves to locate the scales in consecutive registration when being employed for taking outside measurements.

The extension is further provided with a locking pin 35 projecting from its concaved face and adapted to frictionally lock within an arcuate seat 36 formed in the outer end of the body portion 28 and intermediate of the ends of stop member 34, as shown in Figs. 3 and 4. It will be understood, of course, that pin 35 is fastened to the extension in such a position that the resilient end portion of the extension may be flexed, and said pin will enter into frictional locking engagement with its arcuate seat only when slide 31 is in abutting engagement with stop 34 and the scales are in cooperative and consecutive relation to provide a single and continuous measuring scale. Hence, it will be appreciated that the extension will normally be removably locked at the outer end of the body portion, and the tape may be fed into and out of the casing without normally disengaging said locking connection. In the present instance, it will be noted that extension 30 is illustrated as being approximately four inches long, but it will be apparent that it may be of any desired length, it only being essential that the tape portions 28 and 30 may be aligned with each other in such a manner as to provide a continuous and consecutive accurate scale for taking outside measurements.

When it is desired to employ the tape for taking inside measurements, for example, as in measuring between two opposed surfaces, the extension 30 is deflected away from body portion 28, thereby removing pin 35 from locking engagement within its arcuate seat 36. While the extension is thus deflected, it is swung about its pivoted supporting rivet 33 into rearward alignment with the extended body portion of the tape so that the hooked end of said extension will project rearwardly and beyond the casing 20, as shown in Figs. 2 and 5. Slide 31 has two short inwardly and laterally extending arms 37 which slightly overlie the outer edges of the concaved face of body portion 28 without materially obscuring the graduated scale thereon. These inwardly extending arms 37 are provided with transversely aligned end faces 40 which are perpendicularly disposed to the edges of the body portion of the tape and serve as an index line from which readings may be taken on the scale therebeneath. To further aid in reading the scale, these inwardly projecting arms are also provided with opposed inwardly extending pointers 41 in alignment with the end faces 40, as illustrated in Figs. 4 and 5. It will be appreciated, of course, that the distance from the axis of rivet 33 to end faces 40 is such that the distance between the outer extended ends of the rule, when employed in the positions shown in Figs. 2 and 5 for taking inside measurements, will be accurately indicated beneath pointers 41 on the graduated scale of body portion 28. Hence, the same scale may be employed for indicating either inside or outside measurements, as required.

The extension 30 may also be supported by the casing in rearwardly projecting alignment with tape portion 28 when employed to take inside measurements. To accomplish this, we have provided a T-shaped aperture 42 through the extension 30 intermediate of its ends, and this aperture is adapted to be slidably interlocked with an outwardly protruding lug 43 of casing 20 adjacent to the rearward edge of slot 21, as illustrated. The lug 43 is provided with a narrow neck 44 adjacent to the casing and adapted to slidably engage within a narrow throat 45 of aperture 42. Aperture 42 is further provided at its forward end with an enlarged transverse portion 46 sufficiently large to admit head portion 47 of lug 43. It will thus be appreciated that slidably interlocking extension 30 with lug 43 will serve to cooperate with slide member 31 in maintaining the extension and body portion of the tape in substantially reversed alignment for taking inside measurements.

We have illustrated in Figs. 6 to 9 another embodiment of our invention and wherein a suitable cylindrical casing 50, of similar construction to casing 20, is arranged to coilably receive a tape B through a peripheral slot 53 in the casing in the same manner as heretofore described. This tape, which comprises a two-part flexible metallic ribbon having a general concavo-convex cross section, is composed of an elongated body portion 55 and a relatively short but cooperative extension 56 slidably and longitudinally secured thereon by means of a slide member 57 which slidably embraces and maintains the tape portions 55 and 56 in alignment with each other. Slide 57 is provided with two short inwardly and laterally extending arms 58 which slightly overlap the outer edges of the upper concaved face of body portion 55 without materially obscuring a graduated scale marked thereon. The outer end of extension 56 has a hook 59 secured thereto, and the upper concaved face of this extension is provided with a graduated scale which runs from a zero position at its hook end and is adapted to be located in cooperative and consecutive relation with the scale on the body portion 55 when employed for taking external measurements.

The outer or free end of body portion 55 is provided with a transversely extending stop 60 rigidly secured thereto in any suitable manner, as by rivets, and the rearward end of extension 56 opposite from hook 59 is similarly provided with a transverse stop 61 rigidly secured thereto. It will thus be apparent that tape portions 55 and 56 may be slidably moved relative to each other through slide member 57 until the ends of said member are located in abutting engagement with both stops 60 and 61, as illustrated in Figs. 8 and 9. At this position, the graduations on the two tape portions will overlap and mate with each other to form a single accurate measuring scale having consecutive readings whereby distances may be conveniently and accurately indicated from the free or zero end of extension 56.

We preferably lock body portion 55 and extension 56 together while making an external measurement so that the scales will remain in fixed cooperative relation to each other, and there will be no tendency for any relative slidable movement of the two tape portions during a measuring operation. To accomplish this, we have provided a suitable locking means which, in the present instance, is illustrated as having a nib 64 projecting from the lower face of the body portion 55 near its free outer end and arranged to seat within a mating cavity 65 within the upper or graduated face of extension 56. Extension 56 is further provided with a nib 66 projecting from its lower face in alignment with and substantially beneath cavity 65 and arranged to seat within an aperture 67 within the body portion of slide member 57. These nibs and cavities are preferably arranged to be aligned with each other and lie in mating relation when the stops 60 and 61 are in abutting engagement with the opposite ends of slide 57, as shown in Fig. 9.

It will be appreciated that due to the resilient nature of the tape portions 55 and 56, these nibs and cavities form interlocking connections which snap into mating engagement with each other and tend to maintain the tape portions in fixed non-slidable relation, providing a substantially unitary but flexible measuring tape at all times except when the cooperative parts thereof are manually forced towards each other through slide 57 to disengage their interlocking connection. This interlocking connection is made sufficiently rigid to maintain tape portions 55 and 56 in fixed relation to each other whenever the tape is withdrawn from or fed into the casing.

The extension 56 is further arranged to be slidably positioned relative to body portion 55 so that the two tape portions may also co-act with each other for taking inside measurements which will be directly indicated on the scale of body portion 55. To accomplish this, the extension 56 and body portion 55 are slidably forced towards each other through member 57 to disconnect their interlocked relationship and cause extension 56 to project rearwardly beyond casing 50 and yet remain in longitudinal alignment with the extended portion of tape member 55. Stops 60 and 61 are preferably located in respective alignment with the free outer ends of body portion 55 and the rearward end of extension 56, as shown, to aid in locating the ends of the tape when slidably extending the portions thereof into abutting engagement between two surfaces for obtaining an inside measurement therebetween. The inwardly extending arms 58 of slide member 57 are provided with transversely aligned end faces 72 which are perpendicularly disposed to the edges of the body portion of the tape and serve as an index line from which readings may be ascertained on the scale therebeneath. To further aid in reading the scale, these inwardly projecting arms may also be provided with opposed inwardly extending pointers 73 protruding in alignment with the end faces 72, as shown.

When employing our tape for taking an inside measurement, the slide member 57 is first secured to extension 56 in a predetermined position, after which the index line 72 will always accurately indicate on the scale therebeneath the distance between the outer ends of the tape portions adjacent to stops 60 and 61 as the body portion 55 is slidably moved through slide member 57. Various methods may be employed to removably secure the slide 57 to extension 56, and, in the present showing, we have provided a nib 74 projecting from the underside of extension 56 near its hook end and adapted to snap into interlocking engagement with aperture 67 in the same manner as described with relation to nib 66. It will be understood, of course, that nib 74 is so located that index line 72 will be positioned with correct relation to the rearwardly extending end of extension 56 to properly register on the graduated scale therebeneath. Hence, it will be apparent that the same scale on the body portion 55 of our tape may serve to provide a direct reading for either an outside or an inside measurement, as required.

The extension 56 is also supported by the casing 50 in rearwardly projecting alignment with tape portion 55 when employed for taking inside measurements. To accomplish this, we have provided a substantially T-shaped slot 75 of the general type of slot 42 and arranged to slidably interlock with an outwardly projecting lug 77 adjacent to the rearward edge of slot 53 and in the same manner as disclosed with reference to the interlocking of extension 30 with lug 43 on casing 20. Hence, it will be apparent that lug 77 and slide member 57 serve to cooperatively support extension 56 in rearwardly projecting alignment with body portion 55 during an inside measuring operation.

In the present illustrated embodiments of our invention, the measuring tapes and associated parts are shown withdrawn from the casing in operative positions, but it will be appreciated that the respective slots 21 and 53 are of such size as to receive the interconnected tape portions when extended in outside measuring positions, and the connecting slide members are arranged to coil with the tape as it is fed into the casing. It should be further understood that certain of the parts as illustrated in the drawings have been exaggerated to better show their operation. For example, the stops 34, 60, and 61, as well as the slide members, are formed from relatively thin resilient metallic strips commensurate in thickness with the stock of which the tape is formed. Hence, the various parts may be easily coilably received with the tape in a casing.

In view of the fact that many changes could be made in the above construction and many apparently widely different embodiments of this invention could be made without departing from the scope thereof, it is intended that all matter contained in the above description or shown in the accompanying drawings shall be interpreted only as illustrative and not in a limiting sense.

It is also to be understood that the language used in the following claims is intended to cover all of the generic and specific features of this invention as herein described and all statements which, as a matter of language, might be said to fall therebetween.

We claim as our invention:

1. A coilable rule comprising a casing having an entrance slot therein, a flexible measuring tape adapted to pass through said slot and to be coilably received within the casing, said tape including a body portion and an extension cooperable therewith, a member slidably mounted on the body portion and movably securing the body portion and extension in longitudinal slidable relation, a measuring scale on the body portion, a measuring scale on the extension, means to removably secure the extension to the body portion in a predetermined position with the scales in consecutive registering relation, and means for removably securing the extension to the casing and extending rearwardly of the direction of withdrawal of the body portion from the casing and in longitudinal alignment with said body portion whereby the scale graduation on the body portion aligned with an indicating portion of the slide member will register a correct measurement.

2. A coilable rule comprising a two-part flexible measuring tape having a transverse curvature tending to maintain the tape in a rectilinear state, a casing adapted to coilably receive said tape and having an entrance slot through which the tape may pass, said tape including a body portion and a relatively short flexible extension member therefor, a slidable member on the body portion secured to the extension, and cooperating securing means carried by the extension and body portion associated with said slidable member to removably secure the two parts of the tape together in a predetermined cooperative measuring position.

3. A coilable rule comprising a casing having an entrance slot, a flexible measuring tape arranged to pass through said slot and to be coilably received within the casing, said tape including a body portion and a cooperable extension therefor, a member slidably engaging the body portion, a pivotal connection securing the extension and slide member together for relative swinging movement in substantially superimposed relation, an abutment at the free end of the body portion engageable with said slide and limiting the extent of its movement in one direction, and means on the extension adapted to releasably interengage with said abutment when the slide is in engagement therewith, thereby securing the extension and body portion together in predetermined positions and in releasably interlocked relationship.

4. A coilable rule for taking inside and outside measurements comprising a flexible measuring strip having a concavo-convex cross section and an inherent tendency to assume a rectilinear state, a relatively short extension of like character, a slide on said strip pivotally carrying said extension, a graduated scale on the strip and extension starting from zero at the outer free end of the extension, said slide having an index, means for pivotally securing the inner end of the extension to the slide for swinging movement about an axis perpendicular to the plane of the slide for selectively aligning the extension with the strip and forwardly and rearwardly of the slide, a stop on the forward end of the strip engageable with the slide to limit its movement, the forward end of said strip having a recess, and a pin carried by the extension and engageable within said recess to prevent relative slidable movement of the strip and extension and locate the scale portions in consecutive registration when taking outside measurements.

5. A coilable rule comprising a flexible measuring tape having a concavo-convex cross section and a tendency to normally assume a rectilinear state, a casing arranged to coilably receive the tape and having an entrance slot through which the tape is moved, a measuring scale on the tape, an extension cooperatively associated with the tape and having a measuring scale thereon, a slidable member on the tape, an index edge on said member, a pivotal connection securing said member to an end of the extension, detachable locking means connecting the extension and tape in superimposed relationship with the measuring scales in consecutive registration to perform an external measurement, and means to detachably secure an intermediate portion of the extension to the casing so that the extension is directed rearwardly of the tape and the portion of the scale on the tape in alignment with the index edge will accurately indicate an internal measurement.

6. A coilable rule adapted to perform outside and inside measuring operations comprising a two-part flexible measuring tape having a body portion and a cooperable extension therefor, said parts having similar concavo-convex cross sections and an inherent tendency to assume a rectilinear form, a graduated measuring scale on each of said parts, a casing adapted to receive the tape and having an entrance slot through which it is free to move, a slidable member slidably engaging and securing the extension and body portion in superimposed slidable relation, means to selectively interlock the extension and body portion in a predetermined position to locate the measuring scales in consecutive registering relation for performing an external measuring operation, and means to selectively interlock the extension member to the casing in a predetermined position so that it projects rearwardly of the body portion but remains in slidable relation therewith whereby the graduated scale on the body portion may be also employed to directly indicate an internal measurement.

7. A coilable rule for taking inside and outside measurements, comprising a two-part flexible measuring strip having a concavo-convex cross section and an inherent tendency to assume a rectilinear state, a casing for said strip, said strip including a body portion and an extension therefor, said strip being slidably mounted on the body portion, cooperating means carried by said strip and body portion for positioning said extension in forwardly projecting alignment with the body portion, and cooperating means carried by said casing and extension member for positioning the extension in rearwardly projecting alignment with said body portion, said extension member and body portion being provided with a scale thereon in such cooperating relationship that a direct reading is obtained in either of the two extension positions.

AUSTIN L. STOWELL.
FREDERICK A. VOLZ.